S. FURMAN.
MACHINE FOR MAKING WINDOW ENVELOP BLANKS.
APPLICATION FILED JUNE 1, 1915.

1,182,364.

Patented May 9, 1916.
8 SHEETS—SHEET 7.

UNITED STATES PATENT OFFICE.

SAMUEL FURMAN, OF BROOKLYN, NEW YORK.

MACHINE FOR MAKING WINDOW-ENVELOP BLANKS.

1,182,364.  Specification of Letters Patent.  Patented May 9, 1916.

Application filed June 1, 1915. Serial No. 31,484.

*To all whom it may concern:*

Be it known that I, SAMUEL FURMAN, a citizen of the United States, residing at 1713 Park Place, Brooklyn, in the county of Kings and State of New York, have invented a new and useful Machine for Making Window-Envelop Blanks, of which the following is a specification.

My invention relates to improvements in machines for making window envelop blanks, comprising mechanisms for performing any or all of the following functions: 1. Feeding the initially cut blanks into and through the machine. 2. Cutting the window opening in each blank. 3. Gumming a marginal space on the blank adjacent to and encompassing the window opening. 4. Taking the transparent paper from a roll, cutting off patches of a suitable width, and applying the same on to the gummed spaces of the envelop blanks, to form suitable windows for said blanks.

My invention consists in the novel features hereinafter more fully described.

The objects of my improvement are: First, to produce a machine for making window envelop blanks, which will perform its functions in a more perfect way and with a smaller expenditure of time and energy. Second, to have the machine of high speed and relatively small size for its output. Third, to have the same machine foolproof, simple, durable, inexpensive, and its parts readily adjustable and easily replaceable when worn out. I attain these objects by the mechanism illustrated in the accompanying drawings, in which—

All fastenings are omitted from the drawings, also sundry standard machine parts and known devices.

Figure 1:
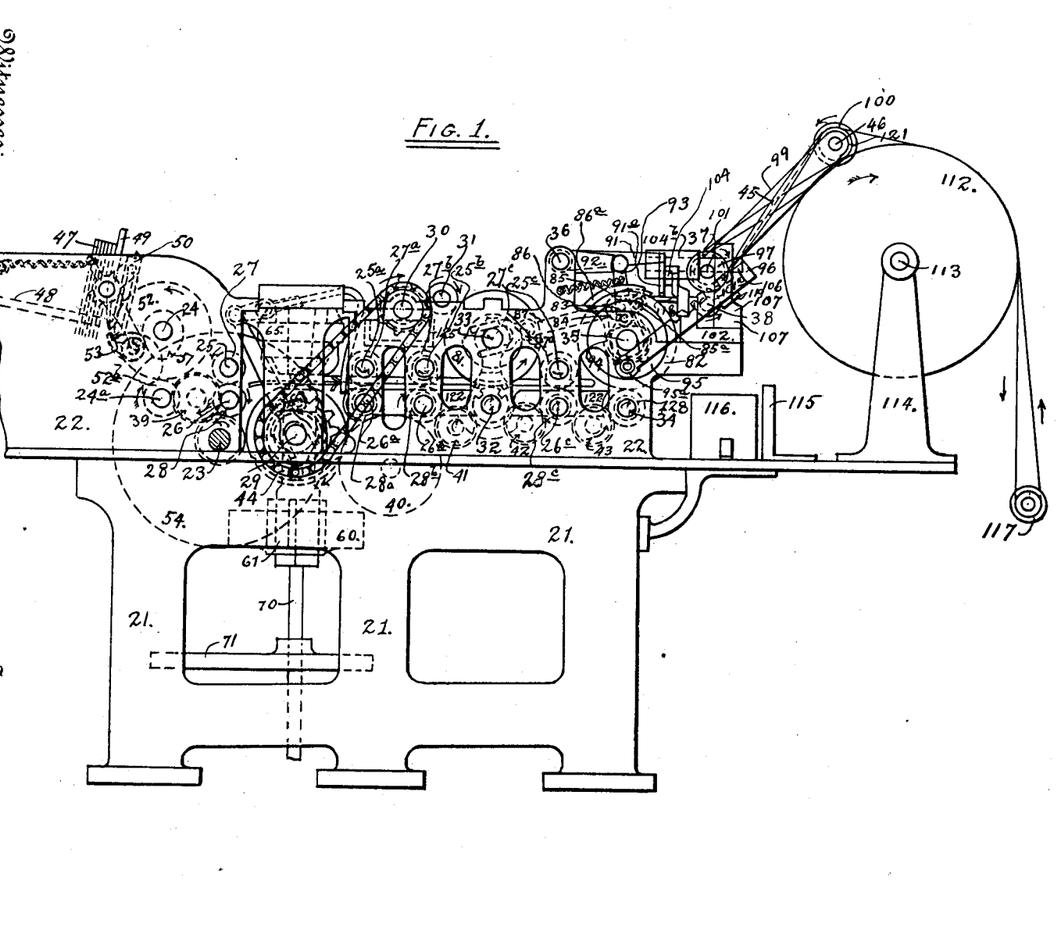
Figure 1 is a side elevation of the entire machine.
Figure 2:
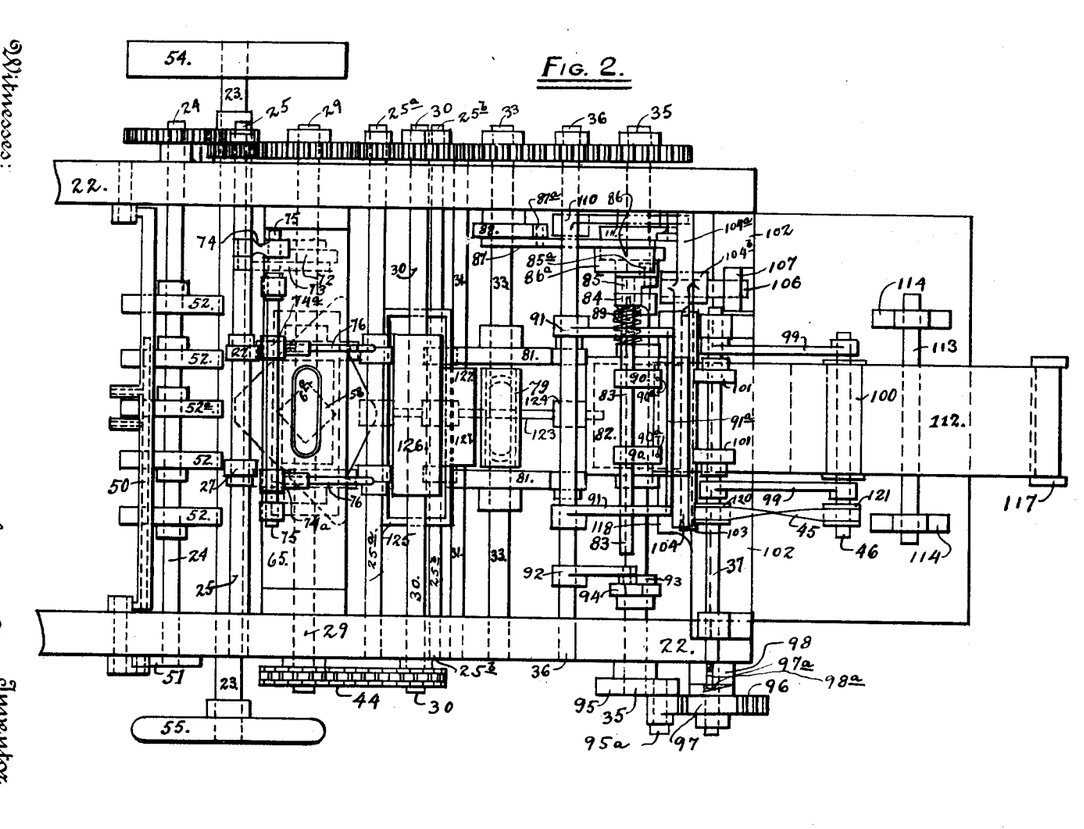
Fig. 2 is a plan of the entire machine, omitting some details, for the sake of clearness.
Figure 3:
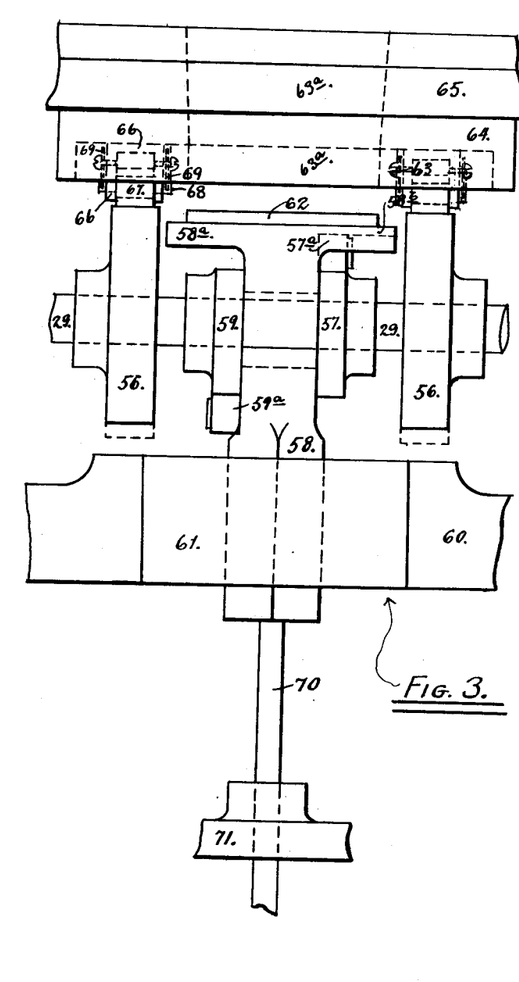
Fig. 3 is a partial end view showing the mechanism for punching or cutting the window opening in the blanks.
Figure 4:
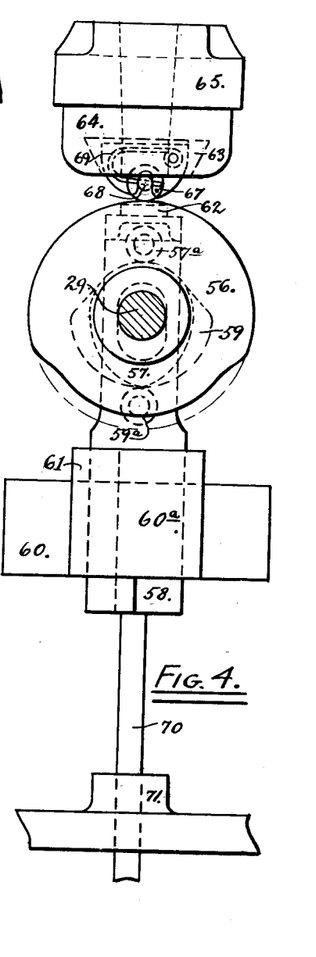
Fig. 4 is a side elevation of the same punching mechanism shown in Fig. 3, drawn to a larger scale than in Figs. 1 and 2, and separate from the other parts of the machine. The stripping plate 78 is omitted from both Fig. 3 and Fig. 4, for the sake of clearness.

Similar numerals and letters refer to similar parts throughout the several views, as follows:

21 is the lower frame of the machine.
22 is the upper machine frame.
23 is the main power shaft.
24 is the upper shaft of the initial feeding mechanism, shown at the left of the machine in Figs. 1 and 2; 24$^a$ is the lower shaft thereof.
25 and 26, also 25$^a$, 26$^a$, 25$^b$, 26$^b$, 25$^c$ and 26$^c$ are shafts for pairs of a train of small feedrolls 27, 28, 27$^a$, 28$^a$, 27$^b$, 28$^b$, 27$^c$ and 28$^c$ respectively.
29 is the shaft operating the window punching or cutting mechanism, illustrated more clearly in Figs. 3 and 4.
30 is the shaft connected to the gum receiving cylinder 126.

31 is the shaft connected to the gum transferring cylinder 127.

Figure 9:
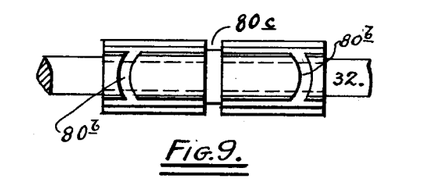
Fig. 9 is an end elevation of the lower gumming cylinder, which is connected to shaft 32.
Figure 10:
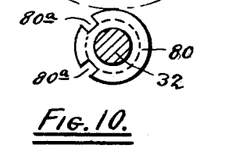
Fig. 10 is a side elevation of the same, also drawn to a larger scale than in Fig. 1.

32 is the shaft supporting the lower gumming cylinder 80, which is more clearly shown in Figs. 9 and 10.

Figure 7:
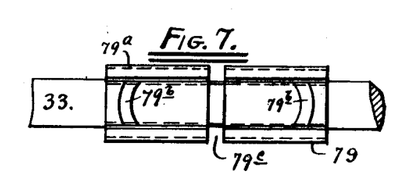
Fig. 7 is an end elevation of the revolving gumming member 79 connected to shaft 33.
Figure 8:
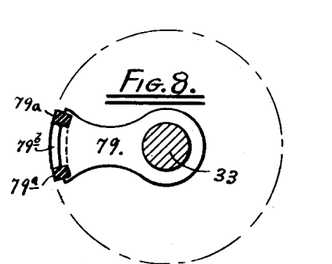
Fig. 8 is a side elevation of the same, with the rubber strips 79$^a$ shown in section, and to a larger scale than in Fig. 1.

33 is the shaft connected to the revolving gumming member 79, which is shown more clearly in Figs. 7 and 8; it also carries the pair of large feeding disks 81.

34 is the shaft connected to the lower patch applying cylinder or blank bed 128.

35 is the shaft connected to the upper patch applying cylinder 82.

36 is the shaft which actuates the clamp 91$^a$ for the transparent paper.

37 is the shaft which carries the upper feed disks 101 of the transparent paper feed also the drop arms 99.

The shafts are turning each in a direction as indicated by the arrow adjacent to it on the drawing, and the motion is transmitted by suitable gear wheels, some of which are shown in Fig. 2, also by chain and sprockets and by a crossed belt shown in Figs. 1 and 2.

38 is the shaft which actuates the lower feed roll 101$^a$ of the transparent paper feed.

39 is the intermediate gear transmitting power from shaft 23 to shaft 24.

40 is an intermediate gear transmitting power from shaft 29 to shaft 26$^a$ and 26$^b$.

41 is an intermediate gear transmitting power from shaft 26$^b$ to shaft 32.

42 is an intermediate gear transmitting power from shaft 32 to shaft 26$^c$.

43 is an intermediate gear transmitting power from shaft 26$^c$ to shaft 34.

44 is a chain for transmitting power from shaft 29 to shaft 30, in conjunction with the sprockets shown in Fig. 1.

45 is a crossed belt for transmitting power from shaft 37 to spindle 46, shown in Fig. 1.

47 is a pile of envelop blanks, initially cut to the required outline, but without window openings. 48 are bars supporting said pile of blanks edgewise; 49 is an inclined plate partly supporting said pile of blanks in an inclined position.

50 is a suction bar and mechanism connected thereto. 51 is a cam for actuating said mechanism 50.

52 are four upper and outer feeding disks connected to shaft 24; 52$^a$ is the inner feeding disk, also connected to shaft 24, and carrying the gripper 53, which may be actuated by any suitable mechanism of either standard or special design.

52$^b$ are the lower feeding disks connected to shaft 24$^a$ and in contact with disks 52 and 52$^a$.

54 is the power pulley connected to shaft 23; 55 is a large hand wheel connected to the same shaft.

56 are two recessed disks connected to shaft 29.

57 is a cam for raising the sliding block 58.

58$^a$ and 58$^b$ are the lateral extensions of the upper end of the block 58.

59 is the cam for lowering the block 58. Cams 57 and 59 are both connected to shaft 29, each in a position, as shown in the drawings.

60 is the lower transverse bar containing the guide 60$^a$ for the block 58.

61 is the removable vertical cover of the guide 60$^a$.

62 is a punch or male die; 63 is a corresponding female die.

63$^a$ is the opening extending vertically through the die 63, block 64, which carries said die 63, and the upper transverse bar 65, to which block 64 is connected by suitable fastenings. The opening 63$^a$ is shown in the drawing as tapering upward, to permit the waste to pass without question.

66 are two brackets connected to block 64. 67 is a roller pivotally and slidably connected to each of said brackets 66 by the pin 68, which is adapted to slide in a suitable slot in each of said brackets 66. 69 are two springs connected to each of said brackets 66, and pressing on pin 68 downwardly.

70 is an extension or sliding rod connected to block 58; 71 is a guide for said rod 70.

76 is a pair of stops for the blanks adapted to keep each blank in place while a window is being punched or cut in it by the punch 62 and die 63. 74$^a$ is a socket adapted to hold each of said stops 76, which can be adjusted in position in said sockets 74$^a$ for various positions of the window cut in the blank.

75 is a spindle to which both sockets 74$^a$ are connected, also the arm 74, which is adapted to oscillate said spindle 75. 73 is a fork actuating said arm 74; 73$^a$ is an antifriction or cam roller on said fork 73. 72 is a cam connected to shaft 29 and in contact with said roller 73$^a$.

77 is a pair of spring clamps connected to the lower end of each of stops 76 and adapted to receive the blank and keep it from rebounding or glancing back.

78 is a stripping plate situated over the recessed disks 56 and sliding block 58; it is used to support the blank when having its window opening cut or punched; it has an opening for the punch 62 to pass through.

79 is a revolving gumming member, connected to shaft 33. 79$^a$ are two longitudinal rubber strips connected to the face of said member 79. 79$^b$ are two curved rubber strips on the face of said member 79. 79$^c$ is a circular groove across the cylindrical surface of the member 79, in the plane of rotation thereof, for the purpose hereinafter described. 80 is a cylinder adapted to support an envelop blank under the revolving member 79. 80ª are longitudinal grooves in the surface of the cylinder 80, adapted to register with said strips 79ª of the member 79. 80ᵇ are curved grooves in the surface of the cylinder 80, adapted to register with said strips 79ᵇ of the member 79.

80ᶜ is a circular groove in the form of cylinder 80 shown in Figs. 9 and 10, for the purpose hereinafter described.

81 are a pair of feed disks on shaft 33, one at each side of the revolving member 79.

Figure 16:
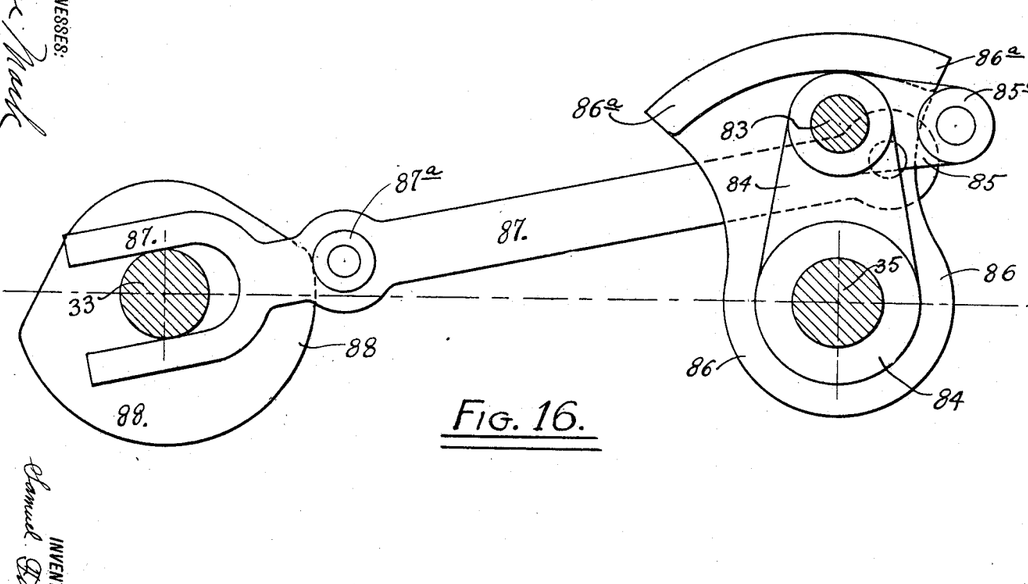
Fig. 16 is an elevation of the revolving arm and oscillating member of the patch-applying mechanism and of the means for actuating the same.

82 is the upper patch applying cylinder, connected to shaft 35; 128 is the lower patch-applying cylinder connected to shaft 34. 84 is an arm connected to said shaft 35. 83 is a revolving and rocking spindle journaled in said cylinder 82 and said arm 84. 85 is a swinging arm connected at one end to said spindle 83 and adapted to revolve with it. 85ª is a cam roller at the other end of arm 85. 86ª is a plate having a variable position, and adapted to intercept said roller 85ª, thereby deflecting said arm 85 and oscillating said spindle 83. 86 is a block, swiveled on shaft 35, and having said plate 86ª fastened thereto. 87 is a fork pivotally connected at one end to said block 86 and guided at the other end on shaft 33 in the manner shown in the drawings. 87ª is a cam roller on said fork 87. 88 is a cam connected to shaft 33 and in contact with said roller 87ª. 89 is a torsional spring connected at one end to said spindle 83, and at the other end to said arm 84 supporting said spindle 83, and adapted to return said arm 85 to its original position after having been deflected by said plate 86ª. 90 are a pair of grippers connected to said spindle 83 and adapted to grip the transparent paper, as is hereinafter described.

Figure 14:
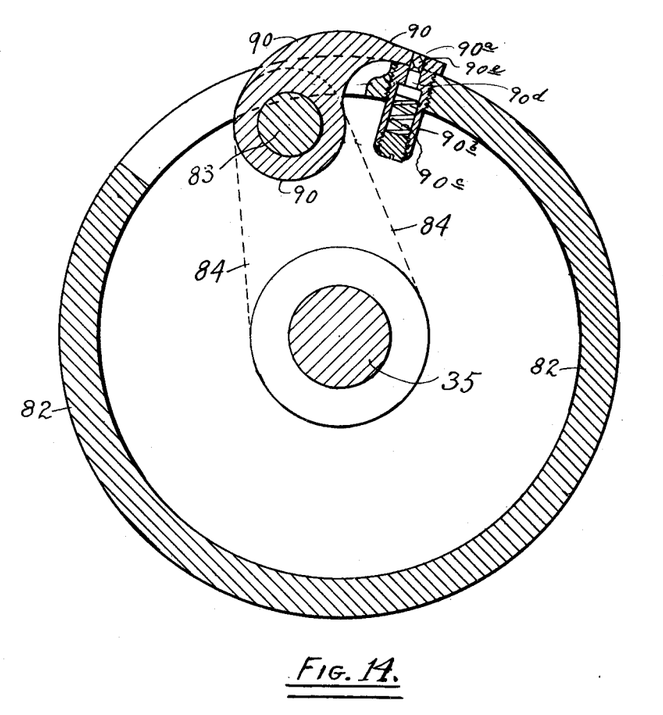
Fig. 14 is a cross section on a large scale of the cylinder 82 and one of the grippers 90, showing the spring pressed pin 90$^d$ and details of the same.

90ª is a small opening at the end of each gripper 90, adapted to receive a spring pressed pin 90ᵈ, shown in Fig. 14, and adapted to hold the patch of transparent paper fast until released in operation. 90ᵇ is a socket, shown in Fig. 14 as screwed into the cylinder 82; 90ᶜ is a spring, inclosed by said socket 90ᵇ, and pressing against the enlarged end of said pin 90ᵈ, which terminates in a spear head or spike 90ᵉ, which is adapted to enter the opening 90ª in each of the grippers 90. Said pin 90ᵈ is adapted to recede into the socket 90ᵇ, against the pressure of the spring 90ᶜ, when brought into contact with the lower patch applying cylinder or blank bed 128, hereinafter described, and thereby release the patch of transparent paper, and apply said patch to said blank on said lower patch applying cylinder or blank bed 128.

91ª is a clamp for holding the transparent paper down to a table 118 while it is being cut and until seized by the grippers 90. 91 are a pair of arms carrying said clamp 91ª, and connected to rocking shaft 36.

92 is an arm connected at one end to shaft 36 and actuating the same and at the other end to a fork 93 which is guided by shaft 35.

94 is a cam connected to shaft 35 and actuating fork 93.

95 is a disk connected to shaft 35 at one end thereof; 95ª is a pin carried by disk 95. 96 is a rack, swiveled at one end on said pin 95ª, the other end thereof sliding in a flat socket 119, which is swiveled on shaft 37. 97 is a pinion connected to said shaft 37, and adapted to mesh with said rack 96. 97ª are three inclined recesses in the side of said pinion 97. 98ª is a spring pressed pin located in an opening in collar 98 and adapted to project into said recesses 97ª, whereby an intermittent motion is imparted to said spindle 37 by the action of said rack 96.

99 are a pair of drop arms swiveled at one end on shaft 37, and carrying at the other end the spindle 46. 120 is a pulley connected to said shaft 37 and transmitting motion by means of the crossed belt 45 to the pulley 121 connected to said spindle 46. 100 is a flanged roller connected to said spindle 46 and having frictional contact with the roll of transparent paper 112, thereby causing the same to turn in the direction of the arrow.

113 is a shaft connected to the paper roll 112; 114 is a pair of suitable brackets for said shaft 113.

117 is a load for the tape of transparent paper which is first unwound forward; then it passes downward under the load 117, forming a loop around it, then it passes upward and over the roller 100, then under a pair of feed disks 101, connected to shaft 37, then over the stationary blade 103, supported by the transverse bar 102, and on to the table 118, where it is held down by the clamp 91ª until cut off by the upper blade 105, which forms a shear with said stationary blade 103.

Figure 11:
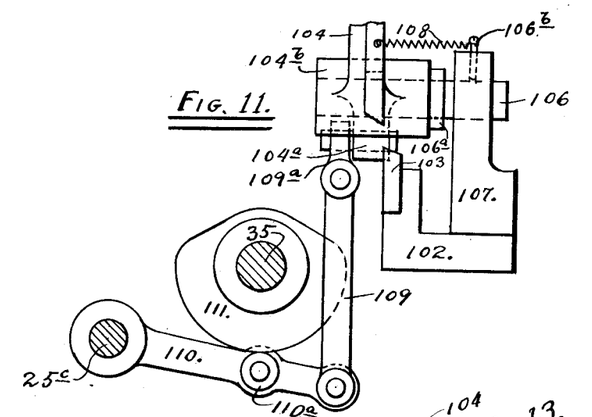
Fig. 11 is a side elevation of the shearing mechanism used for cutting off patches from the roll of transparent paper.
Figures 12, 13:
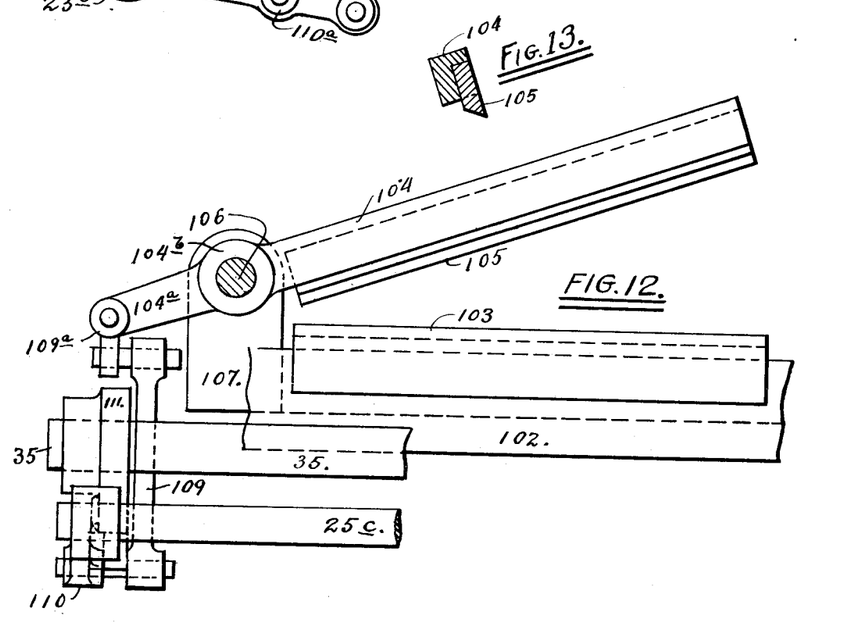
Fig. 12 is an end elevation of the same.
Fig. 13 is a section of the forward arm of the rocking beam 104 with the upper blade 105 of the shearing device.

104 is an oscillating beam to which said blade 105 is connected. 106 is a pin on which said beam 104 is swiveled by means of the sleeve 104ᵇ. 104ª is an arm formed in one with said sleeve 104ᵇ and said beam 104; it is connected to the vertical link 109 by means of the universal joint 109ª. 107 is a bracket for the pin 106. 106ª is a collar on the pin 106; 106ᵇ is a set-screw securing said pin 106 to said bracket 107. 108 is a tensile spring, connected at one end to said beam 104 and at the other end to said set-screw 106ᵇ.

110 is a link swiveled on the shaft 25ᶜ, and connected to the lower end of the link 109; 110ª is a cam roller on said link 110. 111 is a cam, connected to shaft 35, in contact with said roller 110ª, and acting in conjunction with a suitable spring, not shown in the drawings for the sake of clearness, thereby actuating the links 110, 109, the arm 104ª and beam 104 carrying said blade 105; said spring is connected at one end thereof to said link 110, and at the other end to the frame 22 of the machine.

115 is a pair of stationary posts; 116 is a pair of jogging plates for the completed envelop blanks.

122 is a stationary guide situated below the path of the envelop blanks; 123 is an upper stationary guide for the blanks in their passage through the machine.

124 are sockets in the guides 122 and 123, said sockets being swiveled on the shafts 25ª, 25ᵇ, 25ᶜ and 26ª, 26ᵇ, 26ᶜ, respectively.

Figure 15:
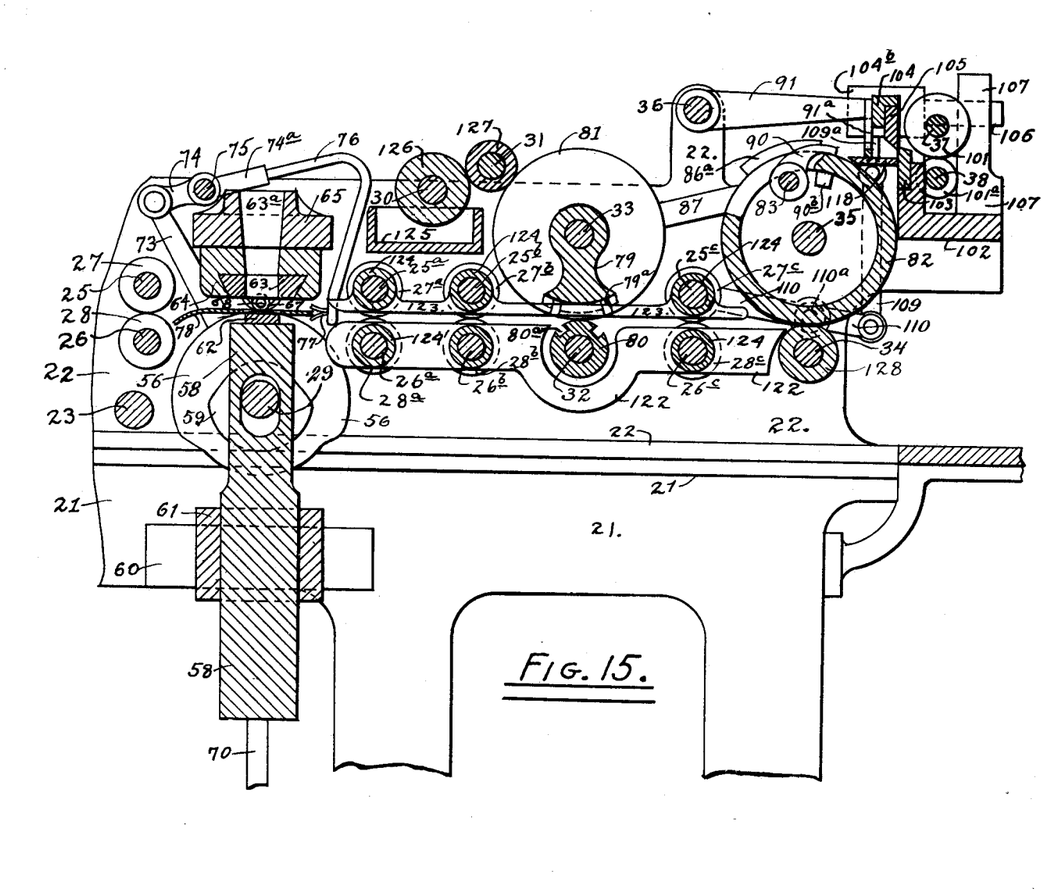
Fig. 15 is a longitudinal section, drawn to a larger scale, on the center line of Fig. 2, showing the main part of my machine for making window envelop blanks, and leaving out some details at the extreme ends of Fig. 2.

The upper guide 123 passes under the revolving gumming member 79 and through the central groove 79ᶜ when said member 79 is in its low position or phase. The lower guide 122, as shown in Figs. 1 and 15, passes under the cylinder 80 at some distance therefrom. It could, however, be designed to pass through a groove, such as 80ᶜ in the form of cylinder 80, shown in Figs. 9 and 10, if desired. Fig. 9 shows one design of cylinder 80, which is suitable for such a guide.

125 is the gum box, which is shown in Figs. 1 and 2 shorter than it really is, for the sake of clearness.

126 is the gum receiving cylinder; 127 is the gum transferring cylinder.

Figure 5:
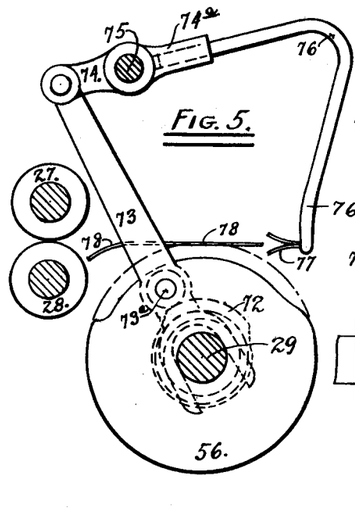
Fig. 5 is a side elevation of the mechanism for operating the stops 76, used in conjunction with the window cutting mechanism above mentioned, and is hereinafter more fully described.
Figure 6:
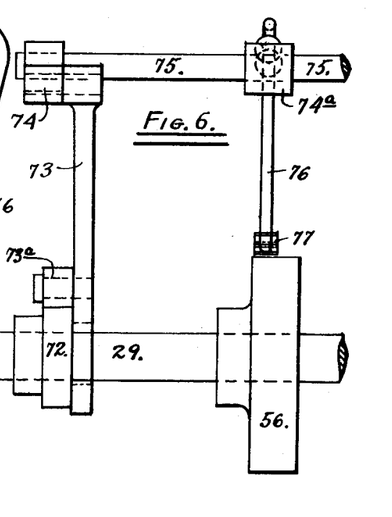
Fig. 6 is an end view of the same stop operating mechanism, showing only one of the two stops with part of their spindle and with the device actuating the same, as is hereinafter more fully described.

The operation of my machine for making window envelop blanks is as follows: The blanks are taken from the pile 47 by the suction bar 50 and brought within reach of the gripper 53 on the middle feed disk 52ª; the gripper releases the blank when it is taken up by and between the feed disks 52, 52ª on the shaft 24 and the set of feed rolls 52ᵇ on the shaft 24ª, directly under the shaft 24 and disks 52. The blank is then delivered to the rolls 27 and 28, which in turn pass it to the stripping plate 78 and the recessed disks 56, where it is halted by the pair of stops 76 and kept from glancing back by the spring clamps 77 attached to the foot of each of the stops 76. The punch 62, in conjunction with the die 63, then cuts a window opening in the blank; the strip of waste is held at first in the opening 63ª until it is loosened by subsequent strips, and it is gradually forced up the tapering passage 63ª. While the blank is being punched, the disk 56 has its recessed part of the periphery adjacent thereto; thereafter the stops 76 are raised by the mechanism shown in Figs. 5 and 6, and simultaneously the blank is seized by and between the full part of the periphery of the disks 56 and the spring pressed rollers 67, and passed on to the feed rolls 27ª, 27ᵇ and 28ª, 28ᵇ respectively between the guides 122 and 123, from which it passes to the gumming cylinder 80, under the revolving gumming member 79 and feeding disks 81. The gum is taken from the box 125 by the cylinder 126 and passed to the cylinder 127, from which it is taken by the rubber strips 79ª and 79ᵇ and delivered to the blank, which is then passed between the feed rolls 27ᶜ and 28ᶜ, then on to the lower patch applying cylinder or blank bed 128, under the upper patch applying cylinder 82, which operates in the manner hereinbefore described. From the patch applying cylinder the blank passes completed to the joggers 116.

The following are some of the special features in the design of my machine for making window envelop blanks, which can readily be seen from the drawings: In my window punching mechanism the blank is kept stationary until the operation is completed; this is accomplished by means of the recessed disks discontinuing the feed, in conjunction with the stops 76 and spring clamps 77. To insure a feeding grip on the blank after cutting the window opening, the spring pressed roller 67 is employed, in conjunction with the recessed disks 56 above referred to. The patch applying cylinder 82, with the revolving spindle 83, spring 89, swinging arm 85 and cam roller 85ª, acts in conjunction with the plate 86ª, oscillating block 86 and the mechanism operating the same for the purpose of imparting a quick and ready motion to the grippers 90 in seizing the patch of transparent paper as soon as it is cut, and in releasing the same. The grippers 90 have each an opening 90ª adapted to receive a spring pressed pin for making a positive grip of the thin and slippery patch of transparent paper.

Many changes could be made in the design of each of the details and combinations of my machine for making window-envelop blanks without departing from the main scope of my invention. I do not, therefore, restrict myself to the exact shape of my machine or any of its parts as shown in the drawings.

What I claim as my invention and desire to secure by Letters Patent is:

1. In a machine for making window envelop blanks a patch-applying mechanism, comprising a rotary carrier for patches of transparent paper, a gripper or grippers on said carrier, said gripper or grippers being adapted to seize said patches, one at a time, and transfer the same to a blank in the rotation of said carrier, a spindle, pivotally connecting said gripper or grippers to said carrier, a spring for keeping said gripper or grippers open, a revolving arm connected to said spindle and adapted to revolve therewith, a deflecting member, adapted to intercept the outer end of said revolving arm during a proper phase in its revolution, thereby closing said gripper or grippers against the tension of said spring, and an oscillating member adapted to impart a quick and sudden motion to said deflecting member during the time of its intercepting the outer end of said arm and thereby imparting a quick and sudden motion to said gripper or grippers during said operation of seizing said patches.

2. A machine for making window envelop blanks comprising a mechanism for cutting window openings in envelop blanks and a gumming mechanism, combined with a means for feeding said blanks through the machine, said cutting mechanism including a suitable stripping plate adapted to support said blanks during the operation of cutting said openings, and said feeding means including a pair of recessed disks operatively connected to said mechanisms and adapted to feed said blanks onto and off said stripping plate and to be out of contact with said blanks during said operation of cutting said openings.

3. A machine for making window envelop blanks comprising a mechanism for cutting window openings in envelop blanks and a gumming mechanism, combined with a means for feeding said blanks through the machine, said means including a pair of recessed disks operatively connected to said mechanisms and adapted to be out of contact with said blanks during the operation of cutting said openings, a stop or stops, adapted to arrest the forward motion of the blanks in cutting position during the operation of cutting said openings, and a suitable socket or sockets adapted to adjustably support said stop or stops.

4. A machine for making window envelop blanks, comprising a mechanism for cutting window openings in envelop blanks, a gumming mechanism and a patch applying mechanism. combined with a means for feeding said blanks through the machine, said means including a pair of recessed disks, operatively connected to said mechanisms and adapted to intermittently discontinue the feeding of said blanks through said mechanism for cutting window openings in said blanks during the operation of cutting said openings, a stop or stops, adapted to arrest the forward motion of the blanks in their course through the machine during the operation of cutting said openings, and a clamp or clamps adapted to prevent the glancing back of said blanks when intercepted by said stops.

5. A machine for making window envelop blanks, comprising a mechanism for cutting window openings in envelop blanks, a gumming mechanism and a patch applying mechanism, combined with a means for feeding said blanks through the machine, said means including a pair of recessed disks, operatively connected to said mechanisms and adapted to intermittently discontinue the feeding of said blanks through said mechanism for cutting window openings in said blanks during the operation of cutting said openings, a stop or stops, adapted to arrest the forward motion of the blanks in their course through the machine during the operation of cutting said openings, and a spring clamp or clamps, connected to said stop or stops and adapted to prevent the glancing back of said blanks when intercepted by said stop or stops.

6. A machine for making window envelop blanks comprising a mechanism for cutting window openings in envelop blanks and a gumming mechanism, combined with a means for feeding said blanks through the machine, said cutting mechanism including a suitable cam or cams and a sliding block adapted to carry a punch and to be actuated by said cam or cams, and said feeding means including a pair of recessed disks, operatively connected to said mechanisms and adapted to be out of contact with said blanks during the operation of cutting said openings, and a shaft connected to said cam or cams and to said disks and adapted to actuate the same.

7. A machine for making window envelop blanks comprising a mechanism for cutting window openings in envelop blanks and a gumming mechanism, combined with a means for feeding said blanks through the machine, said means including a pair of recessed disks operatively connected to said mechanisms and adapted to be out of contact with said blanks during the operation of cutting said openings, thereby discontinuing the feeding of said blanks during said operation, and said feeding means also including spring pressed rollers in contact with said disks and adapted to operate in conjunction therewith to resume the feeding of said blanks after said operation of cutting said openings.

8. A machine for making window envelop blanks comprising a mechanism for cutting window openings in envelop blanks and a gumming mechanism, combined with a means for feeding said blanks through the machine, said means including a pair of recessed disks, operatively connected to said mechanism and adapted to be out of contact with said blanks during the operation of cutting said openings, thereby discontinuing the feeding of said blanks during said operation, and said feeding means also including a member or members in contact with said disks and adapted to operate in conjunction therewith to resume the feeding of said blanks after said operation of cutting said openings.

9. In a machine for making window envelop blanks, a patch applying mechanism comprising a rotary carrier for patches of transparent paper, a blank bed in contact with said rotary carrier, a suitable gripper or grippers and a spring pressed pin on said patch carrier, said gripper or grippers having an opening near the end thereof, and said spring pressed pin being adapted to enter said opening, said gripper or grippers being adapted to seize said patches, one at a time, and secure the same to said pin, which is adapted to take a positive hold of said patches and recede into said patch carrier, when brought into contact with said blank bed, and thereby release said patches and apply the same to said blanks.

10. In a machine for making window envelop blanks a patch applying mechanism comprising a rotary carrier for patches of transparent paper, a blank bed in contact with said rotary carrier, a suitable gripper or grippers and a spring pressed pin on said carrier, said gripper or grippers having an opening near the end thereof, and said pin being adapted to enter said opening, said gripper or grippers being adapted to seize said patches, one at a time, and secure the same to said pin, which is adapted to take a positive hold of said patches and recede into said patch carrier, when brought into contact with said blank bed, and thereby release said patches and apply the same to said blanks, a means for normally actuating said gripper or grippers and a means for imparting a quick and sudden motion to said gripper or grippers during the operation of seizing said patches of transparent paper.

11. In a machine for making window envelop blanks a patch applying mechanism comprising a means for cutting a strip of transparent paper into patches, a means for supporting said patches during the cutting operation, a rotary carrier for said patches, a gripper or grippers on said carrier adapted to seize said patches one at a time and transfer the same to said blanks in the rotation of said carrier, a means for normally actuating said gripper or grippers, and an oscillating member, operatively connected to said mechanism, and adapted to impart a quick and sudden motion to said gripper or grippers during said operation of seizing said patches.

12. A machine for making window envelop blanks comprising a mechanism for cutting window openings in envelop blanks and a gumming mechanism, combined with a means for feeding said blanks through the machine, said cutting mechanism including a suitable stripping plate adapted to support said blanks during the operation of cutting said openings, and said feeding means being adapted to have a continuous motion in one direction and to be brought out of contact with said blanks during said operation of cutting said openings.

13. A machine for making window envelop blanks comprising a mechanism for cutting window openings in envelop blanks and a gumming mechanism, combined with a means for feeding said blanks through the machine, said cutting mechanism including a suitable stripping plate adapted to support said blank during the operation of cutting said openings, and said feeding means including a member or members adapted to have a continuous motion in one direction and to feed said blanks onto and off said stripping plate and to be brought out of contact with said blanks during said operation of cutting said openings.

14. A machine for making window envelop blanks comprising a mechanism for cutting window openings in envelop blanks and a gumming mechanism, combined with a means for feeding said blanks through the machine, said cutting mechanism including a suitable stripping plate adapted to support said blank during the operation of cutting said openings, and said feeding means including a pair of feed disks adapted to have a continuous motion in one direction to feed said blanks onto and off said stripping plate and to be brought out of contact with said blanks during said operation of cutting said openings.

15. In a machine for making window envelop blanks a patch applying mechanism comprising a rotary carrier for patches of transparent paper, a blank bed in contact with said rotary carrier, a gripper or grippers mounted on said rotary carrier adapted to seize a patch of transparent paper and secure it to said patch carrier, a means for holding said patch on said patch carrier, said holding means being adapted to coöperate with said gripper or grippers and to release said patch, when brought into contact with said blank bed, and thereby apply said patch to said blank.

16. In a machine for making window envelop blanks a patch applying mechanism comprising a rotary carrier for patches of transparent paper, a suitable gripper or grippers on said carrier, said gripper or grippers being adapted to seize said patches one at a time and transfer the same to said blanks in the rotation of said carrier, and a means for normally actuating said gripper or grippers, said means comprising a suitable spindle pivotally connecting said gripper or grippers to said carrier, a suitable spring for keeping said gripper or grippers open, a revolving arm connected to said spindle and adapted to revolve therewith, and a deflecting member adapted to intercept the outer end of said revolving arm during a proper phase in its revolution, thereby closing said gripper or grippers against the tension of said spring.

17. In a machine for making window envelop blanks a patch-applying mechanism comprising a rotary carrier for patches of transparent paper, a suitable gripper or grippers on said carrier, said gripper or grippers being adapted to seize said patches one at a time and transfer the same to said blanks in the rotation of said carrier, and a means for normally actuating said gripper or grippers, said means comprising a suitable spindle pivotally connecting said gripper or grippers to said carrier, a suitable spring for keeping said gripper or grippers open, a revolving arm connected to said spindle and adapted to revolve therewith, and a curved plate adapted to intercept the outer end of said revolving arm during a proper phase in its revolution, thereby closing said gripper or grippers against the tension of said spring.

18. A machine for making window envelop blanks, comprising a mechanism for cutting window openings in envelop blanks, a gumming mechanism and a patch applying mechanism, combined with a means for feeding said blanks through the machine, a stop or stops, operatively connected to said mechanisms and adapted to arrest the forward motion of the blanks through the machine during the operation of cutting said openings, and a clamp or clamps adapted to prevent the glancing back of said blanks when intercepted by said stops.

19. A machine for making window envelop blanks, comprising a mechanism for cutting window openings in envelop blanks, a gumming mechanism and a patch applying mechanism, combined with a means for feeding said blanks through the machine, a stop or stops, operatively connected to said mechanisms and adapted to arrest the forward motion of said blanks through the machine during the operation of cutting said openings, and a spring clamp or clamps, connected to said stop or stops and adapted to prevent the glancing back of said blanks when intercepted by said stop or stops.

20. A machine for making window envelop blanks, comprising a mechanism for cutting window openings in envelop blanks, a gumming mechanism and a patch applying mechanism, combined with a means for feeding said blanks through the machine, said means comprising a pair of feed disks, operatively connected to said mechanisms and, adapted to discontinue the feeding of said blanks through said cutting mechanism during the operation of cutting said openings, and spring pressed rollers in contact with said disks and adapted to operate in conjunction therewith to resume the feeding of said blanks after the operation of cutting said openings.

21. In a machine for making window envelop blanks a patch applying mechanism comprising a rotary carrier for patches of transparent paper, a blank carrier, a gripper or grippers pivotally connected to said rotary carrier, a suitable socket secured to said rotary carrier flush with the periphery thereof, a suitable pin adapted to slide in the upper end of said socket and extend beyond the periphery of said carrier, a spring in said socket adapted to press said pin outwardly, said gripper or grippers having an opening near the end thereof, and said pin being adapted to enter said opening, said gripper or grippers being adapted to seize said patches, one at a time, and secure the same to said pin, which is adapted to take a positive hold of said patches and recede into said socket, when brought into contact with said blank carrier, and thereby release said patches and apply the same to said blanks, and a means for actuating said gripper or grippers.

SAMUEL FURMAN.

Witnesses:
ABRAHAM J. LIPPMAN,
ABRAHAM FARBER.

Copies of this patent may be obtained for five cents each, by addressing the "Commissioner of Patents, Washington. D. C."